United States Patent
Fan et al.

(10) Patent No.: US 7,444,043 B2
(45) Date of Patent: Oct. 28, 2008

(54) 2×2 MECHANICAL OPTICAL SWITCH

(75) Inventors: Kuang-Chao Fan, Taipei (TW);
Wu-Lang Lin, Taipei (TW); Tien-Tung Chung, Taipei (TW); Yao-Joe Yang, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 11/843,421

(22) Filed: Aug. 22, 2007

(65) Prior Publication Data
US 2008/0175534 A1   Jul. 24, 2008

(30) Foreign Application Priority Data
Jan. 23, 2007   (TW) .............................. 96102569 A

(51) Int. Cl.
G02B 6/26   (2006.01)
G02B 6/42   (2006.01)
(52) U.S. Cl. ....................................................... 385/16
(58) Field of Classification Search ..................... 385/18
See application file for complete search history.

(56) References Cited

U.S. PATENT DOCUMENTS

| | | | |
|---|---|---|---|
| 6,229,640 B1 * | 5/2001 | Zhang | 359/290 |
| 6,303,885 B1 * | 10/2001 | Hichwa et al. | 200/181 |
| 6,711,321 B2 | 3/2004 | Helin et al. | |
| 6,819,809 B2 | 11/2004 | Yoon et al. | |
| 2003/0077028 A1 * | 4/2003 | Lee et al. | 385/18 |

* cited by examiner

*Primary Examiner*—Michelle R. Connelly-Cushwa
*Assistant Examiner*—Chris Chu
(74) *Attorney, Agent, or Firm*—Hoffmann & Baron, LLP

(57) ABSTRACT

A 2×2 mechanical optical switch includes a base, four collimators (two input collimators and two output collimators), an ultra thin mirror (double-sided reflection) and a switching mechanism of the mirror. This switch utilizes four collimators, which are arranged 90° with each other on a common plane, to emit and receive parallel light beams at a certain distance. The light beams are reflected by an ultra thin mirror. When the mirror is moved away from the intersection point of two optical paths, the input lights will directly enter into output channels (transmission state). While the mirror is moved to the intersection point which is the reflection position, the optical beams will be bent into alternate output channels (reflection state) simultaneously from both sides of the ultra thin mirror.

5 Claims, 5 Drawing Sheets

2×2 MECHANICAL OPTICAL SWITCH

FIELD OF THE INVENTION

The present invention relates to an optical switch of an optical fiber communication system, and more particularly to an optical switch using a motive force of a mechanical component to drive a double-sided reflection ultra thin mirror for switching an optical path, and the optical switch can quickly cross connect or switch the transmission path of an optical signal and transmit the signal to a specific output optical fiber. In the meantime, the novel design and structure of the invention can achieve the automatic manufacturing and alignment of the optical switch easily and lower the manufacturing cost of the optical switch.

BACKGROUND OF THE INVENTION

Optical switch is one of the essential components of an all-optical network for performing a direct, cross, and multi-way switching transmission of optical signals in an optical fiber network system. In the past, a widely used optical switch generally converted an inputted optical signal into an electric signal, and then switched the path of the electric signal, and finally converted the electric signal into another optical signal coupled to the optical fiber. This method is complicated and power-consuming, and thus it is not advantageous for the future development and popularity of the all-optical network system.

The optical switch can be divided mainly into the following types: a mechanical optical switch (including a prism type, a MEMS type, and a fiber type), an optoelectronic optical switch, a liquid crystal optical switch, an optothermal optical switch, a magnetic optical switch and an acoustic optical switch according to the operating principle. Although there are various different models of optical switches, yet most of the optical switches used in the all-optical network are mechanical optical switches, and optical switch becomes a mainstream in the market of optical communication components.

The mechanical optical switch uses an actuator which is a mechanical component such as a comb drive, a motor, and a cam having a motive force to drive a micro mirror (MEMS type), an optical fiber (fiber type, optical fiber to optical fiber type) or a prism (prism type) for switching the optical path. The weights of these applications are 7% for the MEMS type, 9% for the optical fiber type, and 84% for the prism type.

Many different models of 2×2 mechanical optical switches have been disclosed in the prior arts, but a vast majority of these switches are manufactured by an all-MEMS process. Since the dimensions of the optical switch manufactured by the all-MEMS process are very small, it is necessary to use a lens fiber (such as ball-lens fiber or taper lens fiber) for the assembling, and thus these switches incur a higher manufacturing cost, a very short working distance (approximately 100 microns to 300 microns), and a very serious lateral misalignment sensitivity. For instance, a lens fiber such as a ball-lens fiber is used for assembling and alignment, which usually causes a misalignment of 1 μm and an optical loss of 1~2 dB.

As to a prior art that employs a 2×2 mechanical optical switch for the micro mirror, the 2×2 optical switch as disclosed in U.S. Pat. No. 6,819,809 installs a micro mirror device at a torque rod and applies a voltage to an electrode disposed adjacent to the mirror, and electric charges drive the micro mirror to rotate, so as to change the optical transmission. The optical switch disclosed in U.S. Pat. No. 6,711,321 installs a micro mirror at a cantilever beam and controls an electromagnetic force to attract the cantilever beam to set the operating position of the micro mirror.

The 2×2 mechanical optical switch manufactured by the foregoing method achieves the functions of the 2×2 optical switch, but the thickness of the micro mirror produced in the micro mirror manufacturing process affects the alignment precision, and thus it is necessary to use a precise control mechanism to avoid optical loss due to inaccurate alignment. However, a high precision control mechanism has the disadvantages of high cost and poor long-time stability, so that a high precision control mechanism is not advantageous to product commercialization and market competitiveness.

Therefore, developing a 2×2 mechanical optical switch with an easy automatic manufacture and alignment to lower the manufacturing cost of the optical switch and increase the long-time stability becomes an important subject for manufacturers and an objective of the present invention.

SUMMARY OF THE INVENTION

It is a primary objective of the present invention to provide a mechanical optical switch with a novel structural design and a simple optical assembling and to increase the long-time stability. In view of the foregoing shortcomings (including high cost, large volume, and poor stability) of the conventional 2×2 mechanical optical switch, the inventor of the present invention based on years of experience to conduct extensive researches and experiments, and finally developed a novel structural design by the high precision technology and MEMS manufacturing process. MEMS technology is used for manufacturing a double-sided reflection ultra thin mirror with an ultra thin reflection Au/Cr layer and designing a switching mechanism for controlling the sway of the double-sided reflection ultra thin mirror by a sway method, and a relay serves as a switching mechanism for moving the position of the double-sided reflection ultra thin mirror. Since the swaying mechanical structure features a simple manufacturing process and a low cost, and the ultra thin double-sided reflection ultra thin mirror features an easy assembling, the efficiency of the whole 2×2 optical switch is very high. The present invention leverages the advantages of the high precision of the MEMS technology to overcome the drawback of requiring a lens fiber for the improvement of the alignment and manufacturing of the MEMS 2×2 optical switch, and thus the invention can greatly reduce the large misalignment and optical loss of the 2×2 optical switch due to the thickness of the mirror, and avoid the high material and manufacturing costs incurred in the full micro electro mechanical process, manufacture, and the use of a lens fiber. Unlike traditional double-sided reflection ultra thin mirrors or prism mechanical 2×2 optical switches the present invention can greatly lower the level of difficulty of the alignment.

The 2×2 optical switch of the present invention employs a long distance collimator for the assembly and alignment to give a longer working distance (approximately equal to 20 cm), a lower manufacturing cost (approximately equal to ⅕ of the manufacturing cost of the ball-lens fiber or the taper lens fiber) and a lower optical loss caused by the lateral misalignment (approximately equal to ⅕ of the optical loss of the ball-lens fiber or the taper lens fiber). Further, the structural design of the present invention adopts a manufacturing method that integrates high precision manufacture and micro electro mechanical process instead of the fill micro electro mechanical process, so as to lower the manufacturing cost to ⅕~ 1/10 of that of the 2×2 optical switch of the traditional double-sided reflection ultra thin mirror.

The 2×2 mechanical optical switch of the invention comprises: a base, having a central hole; a first input collimator and a first output collimator, disposed on a plane of the base, and forming a first transmission optical path between the first input collimator and the first output collimator that passes through a central point; a second input collimator and a second output collimator, disposed on the plane, and forming a second transmission optical path between the second input collimator and the second output collimator that passes through the central point; a mirror switch, installed in the central hole of the base; a double-sided reflection ultra thin mirror, installed at the mirror switch and positioned at the central point above the top plane of the base. When the double-sided reflection ultra thin mirror leaves the central point, a signal of the first input collimator is sent to the first output collimator along the first transmission optical path, and a signal of the second input collimator is sent to the second output collimator along the second transmission optical path. When the double-sided reflection ultra thin mirror stays at the central point, a signal of the first input collimator is sent to the second output collimator along a first reflection optical path, and a signal of the second input collimator is sent to the first output collimator along a second reflection optical path. Therefore, the 2×2 mechanical optical switch can be manufactured and aligned by automation to lower the manufacturing cost and increase the long-time stability of the optical switch.

The above and other objects, features and advantages of the present invention will become apparent from the following detailed description taken with the accompanying drawing.

DETAILED DESCRIPTION OF THE PREFERRED EMBODIMENTS

To make it easier for our examiner to understand the objective, innovative features and performance of the present invention, we use preferred embodiments and the accompanying drawings for a detailed description of the present invention.

Figure 1:
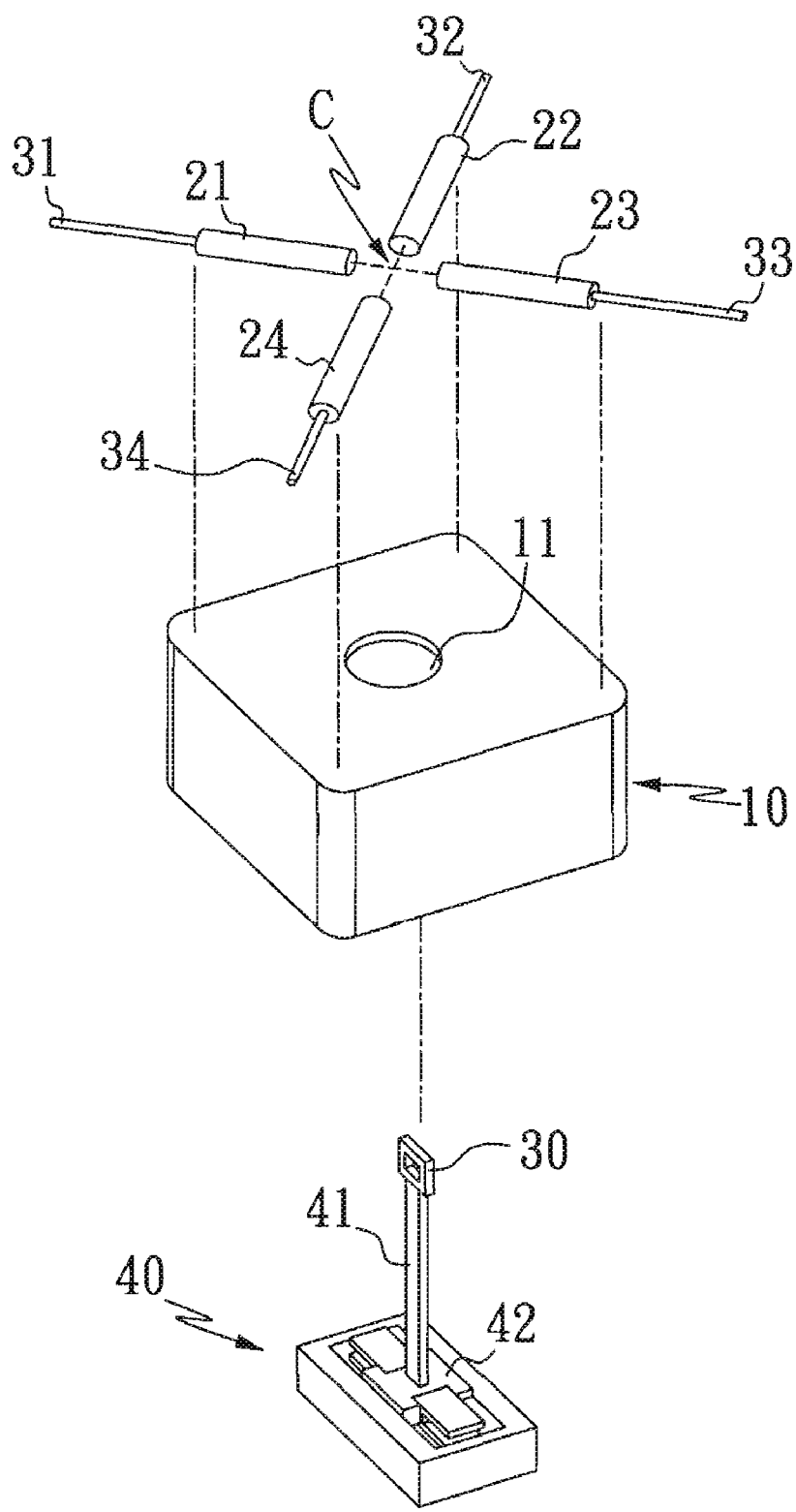
FIG. 1 is an exploded view of a 2×2 mechanical optical switch in accordance with a preferred embodiment of the present invention.
Figure 2:
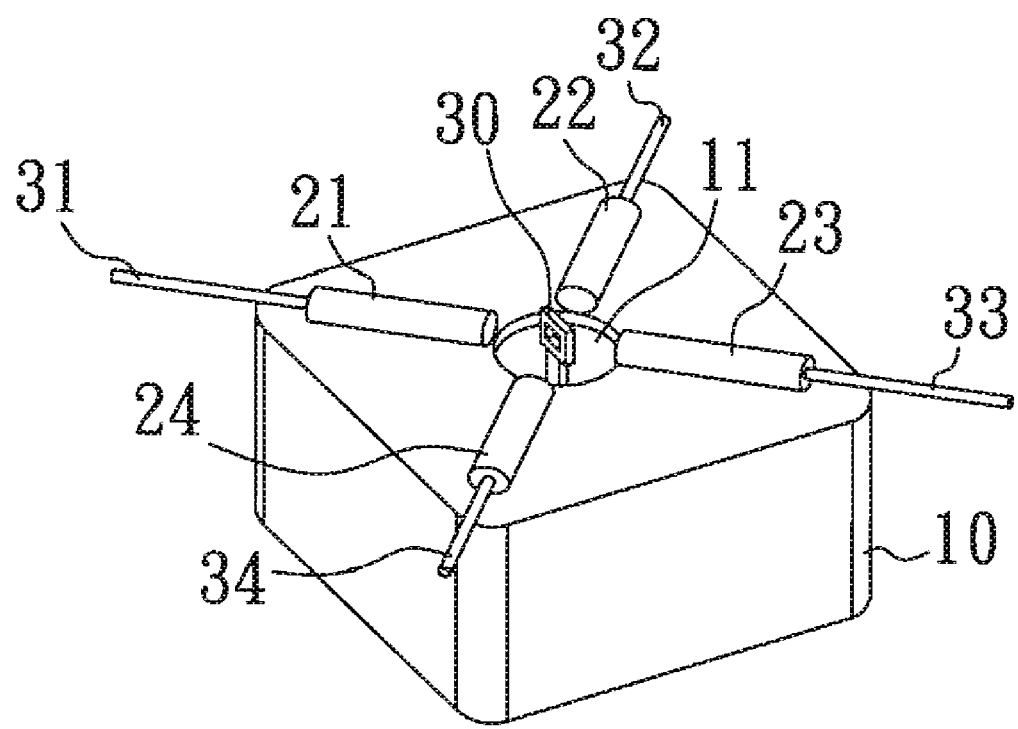
FIG. 2 is a perspective view of a 2×2 mechanical optical switch in accordance with a preferred embodiment of the present invention.

Referring to FIGS. 1 and 2 for an exploded view and a perspective view of a 2×2 mechanical optical switch in accordance with the present invention respectively, the 2×2 mechanical optical switch comprises a base 10, two input collimators 21, 22, two output collimators 23, 24, a double-sided reflection ultra thin mirror 30 and a mirror switch 40, wherein the collimators 21, 22, 23, 24 are coupled to optical fibers 31, 32, 33, 34 respectively, and the two input collimators 21, 22 and the two output collimators 23, 24 are installed on a common plane of the base 10, and the connection line of the input collimator 21 and the output collimator 23 is intersected with the connection line of the input collimator 22 and the output collimator 24 at central point C. The mirror switch 40 is swayed to control a double-sided reflection ultra thin mirror to leave or stay at the central point C, and the mirror switch 40 includes a relay 42 and a mechanical arm 41, and one end of the mechanical arm 41 is connected to the relay 42, and another end of the mechanical arm 41 is connected to the double-sided reflection ultra thin mirror 30. The mirror switch 40 is positioned at the center of the central hole 11 of the base 10, and the vertical position of the double-sided reflection ultra thin mirror 30 is above the top plane of the base 10. The thickness of the double-sided reflection ultra thin mirror 30 is preferably less than 2 microns, and the surface coarseness is preferably less than 6 nanometers, so that the relay 42 can use an electromagnetic force to control the mechanical arm 41 to move the double-sided reflection ultra thin mirror 30 to stay at or leave the central point C.

Figure 3:
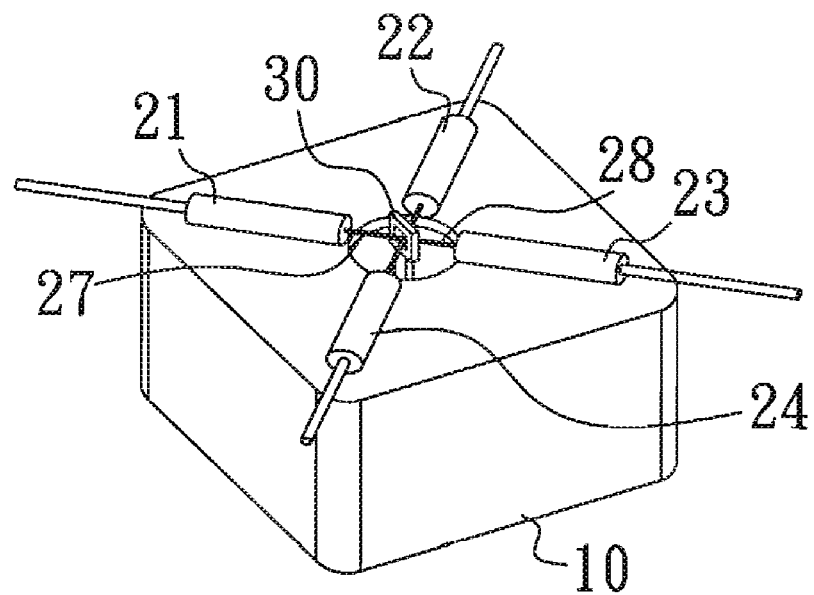
FIG. 3 is a schematic view of moving a double-sided reflection ultra thin mirror of a 2×2 of a mechanical optical switch to a central point in accordance with a first preferred embodiment of the present invention.
Figure 4:
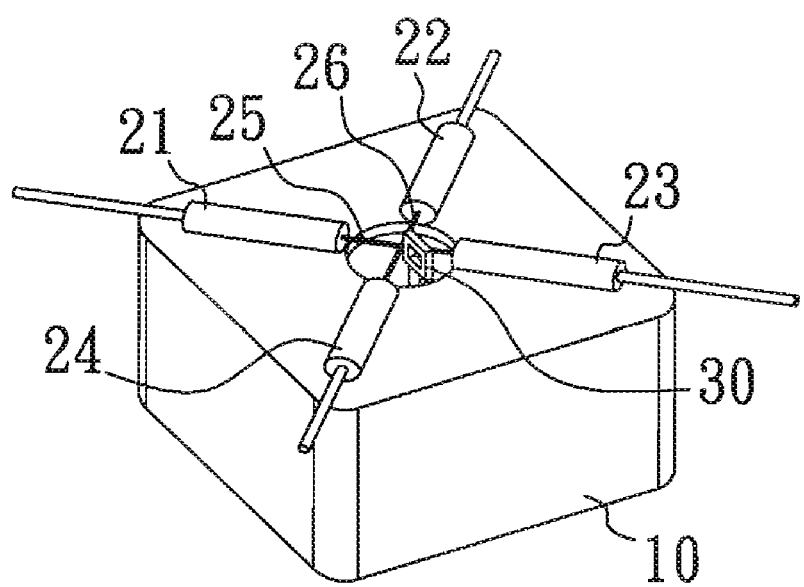
FIG. 4 is a schematic view of moving a double-sided reflection ultra thin mirror of a 2×2 of a mechanical optical switch away from a central point in accordance with a first preferred embodiment of the present invention.
Figure 5:
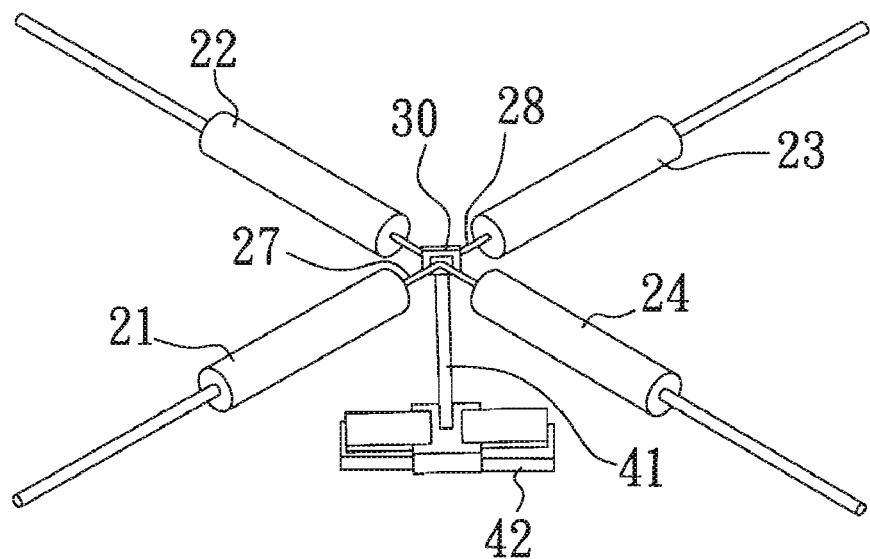
FIG. 5 is a schematic view of the movement of a relay of a 2×2 mechanical optical switch in accordance with a first preferred embodiment of the present invention.
Figure 6:
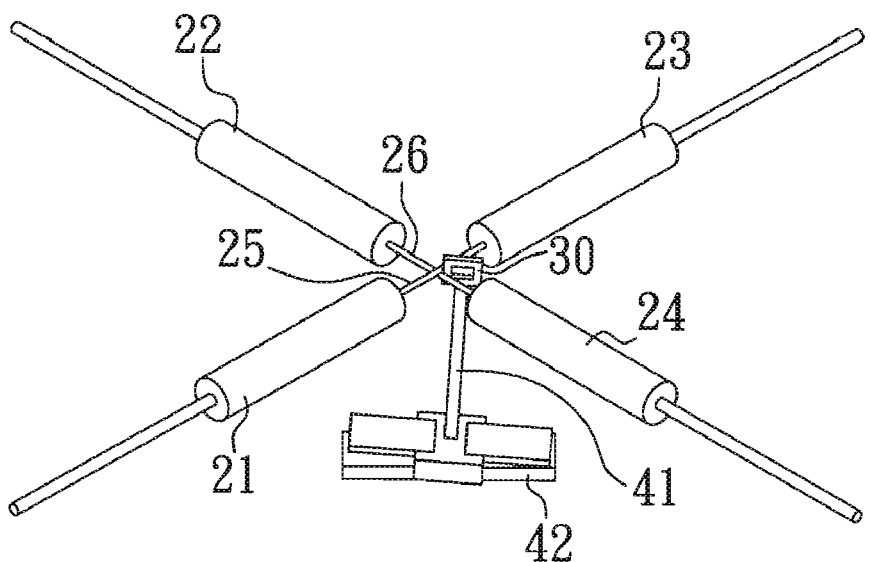
FIG. 6 is another schematic view of the movement of a relay of a 2×2 mechanical optical switch in accordance with a first preferred embodiment of the present invention.

Referring to FIGS. 3 and 4 respectively for the schematic views of moving a double-sided reflection ultra thin mirror of a 2×2 of a mechanical optical switch to/from a central point in accordance with a first preferred embodiment of the present invention, and FIGS. 5 and 6 respectively for the schematic views of moving the relay to/from the central point in accordance with a first preferred embodiment of the present invention, a first transmission optical path 25 as shown in FIG. 4 is formed between the first input collimator 21 and the first output collimator 23, and passed through a central point C at the top of the base, and disposed at a position with an appropriate distance from the central point C; and a second transmission optical path 26 is formed between the second input collimator 22 and the second output collimator 24, and passed through the central point C at the top of the base, and disposed at a position with an appropriate distance from the central point C.

When the double-sided reflection ultra thin mirror 30 leaves the central point C, the state of the mirror switch in the base 10 is shown in FIG. 6, wherein a signal of the first input collimator 21 is sent to the first output collimator 23 along the first transmission optical path 25, and a signal of the second input collimator 22 is sent to the second output collimator 24 along the second transmission optical path 26. When the double-sided reflection ultra thin mirror 30 stays at the central point C, the state of the mirror switch is shown in FIG. 5, wherein a signal of the first input collimator 21 is sent to the second output collimator 24 along the first reflection optical path 27, and a signal of the second input collimator 22 is sent to the first output collimator 23 along the second reflection optical path 28.

Figure 7:
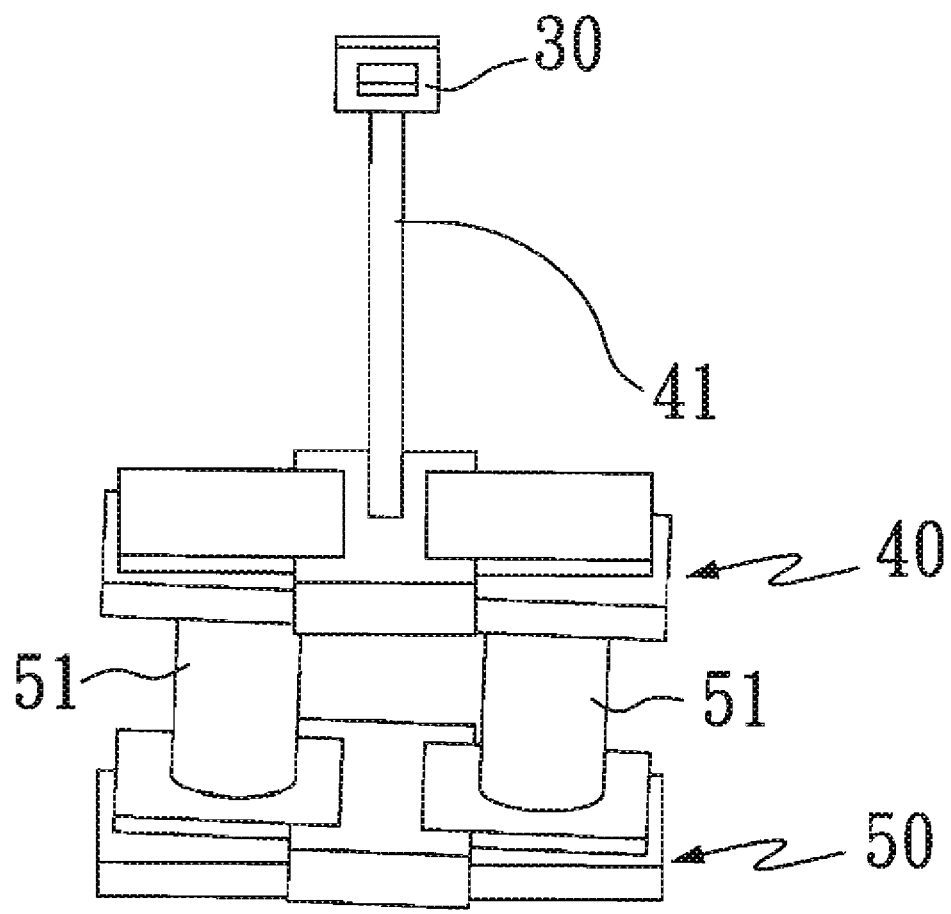
FIG. 7 is a perspective view of a 2×2 mechanical optical switch in accordance with another preferred embodiment of the present invention.

Referring to FIG. 7 for another preferred embodiment of the present invention, a mirror switch 40 is coupled to an external mirror switch 50 by two mechanical arms 51, and the sway of the mechanical arm 41 and the two mechanical arms 51 can increase the sway amplitude of the double-sided reflection ultra thin mirror 30 to cope with the mechanical design that requires a larger amplitude.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A 2×2 mechanical optical switch, comprising:
    a base, having a central hole;
    a first input collimator and a first output collimator, disposed on a plane of the base, and forming a first transmission optical path between the first input collimator and the first output collimator that passes through a central point;
    a second input collimator and a second output collimator, disposed on the plane, and forming a second transmission optical path between the second input collimator and the second output collimator that passes through the central point;
    a double-sided reflection ultra thin mirror, disposed at the mirror switch and passed through the central hole, such that when the double-sided reflection ultra thin mirror leaves the central point, a signal of the first input collimator is sent to the first output collimator along the first transmission optical path, and a signal of the second input collimator is sent to the second output collimator along the second transmission optical path, and when the double-sided reflection ultra thin mirror stays at the central point, a signal of the first input collimator is sent to the second output collimator along a first reflection optical path, and a signal of the second input collimator is sent to the first output collimator along a second reflection optical path;
    a mirror switch, disposed in the central hold of the base, for controlling the double-sided reflection ultra thin mirror to leave or stay at the central point by swaying the mirror switch; and
    an external mirror switch coupled to the mirror switch for increasing the sway amplitude of the mirror switch.

2. The 2×2 mechanical optical switch in accordance with claim 1, wherein the double-sided reflection ultra thin mirror has a thickness less than two microns.

3. The 2×2 mechanical optical switch in accordance with claim 1, wherein the double-sided reflection ultra thin mirror has a surface coarseness less than six nanometers.

4. The 2×2 mechanical optical switch in accordance with claim 1, wherein the mirror switch comprises a relay and a mechanical arm, and one end of the mechanical arm is connected to the relay, and another end of the mechanical arm is connected to the double-sided reflection ultra thin mirror.

5. The 2×2 mechanical optical switch in accordance with claim 1, wherein the external mirror switch comprises two mechanical arms and a relay, and one end of the mechanical arm is coupled to the relay, and another end of the mechanical arm is coupled to the mirror switch.

* * * * *